(12) United States Patent
Rigaud et al.

(10) Patent No.: US 9,702,593 B2
(45) Date of Patent: Jul. 11, 2017

(54) ENCLOSURE REFRIGERATED BY A HYBRID COMPRESSION/ABSORPTION REFRIGERATION SYSTEM

(71) Applicant: COLDWAY, Pia (FR)

(72) Inventors: Laurent Rigaud, Pia (FR); Francis Kindbeiter, Pia (FR)

(73) Assignee: COLDWAY, Pia (FR)

( * ) Notice: Subject to any disclaimer, the term of this patent is extended or adjusted under 35 U.S.C. 154(b) by 101 days.

(21) Appl. No.: 14/415,442

(22) PCT Filed: Jul. 16, 2013

(86) PCT No.: PCT/FR2013/000189
§ 371 (c)(1),
(2) Date: Jan. 16, 2015

(87) PCT Pub. No.: WO2014/013146
PCT Pub. Date: Jan. 23, 2014

(65) Prior Publication Data
US 2015/0121916 A1    May 7, 2015

(30) Foreign Application Priority Data
Jul. 17, 2012    (FR) ..................................... 12 02024

(51) Int. Cl.
*F25B 17/00*    (2006.01)
*F25B 17/08*    (2006.01)
(Continued)

(52) U.S. Cl.
CPC ........... *F25B 17/00* (2013.01); *B60H 1/3201* (2013.01); *B60H 1/3232* (2013.01); *B60P 3/20* (2013.01);
(Continued)

(58) Field of Classification Search
CPC .. F25B 17/00; F25B 2700/2116; F25B 17/08; B60P 3/20; B60H 1/3201; B60H 1/3232
See application file for complete search history.

(56) References Cited

U.S. PATENT DOCUMENTS

| | | | |
|---|---|---|---|
| 5,163,302 A | 11/1992 | Swadner et al. | |
| 2003/0167925 A1* | 9/2003 | Aikawa | B60H 1/00492 96/126 |
| 2006/0112706 A1* | 6/2006 | Inoue | B60H 1/3201 62/238.3 |

FOREIGN PATENT DOCUMENTS

| | | | | |
|---|---|---|---|---|
| DE | 10-2005-004397 A | 9/2005 | | |
| FR | 2705623 A1 * | 12/1994 | ............. | B60H 1/005 |
| FR | 2721696 A1 * | 12/1995 | ............. | F25B 17/08 |

OTHER PUBLICATIONS

International Search Report for PCT/FR2013/000189 dated Sep. 30, 2013.

\* cited by examiner

*Primary Examiner* — Emmanuel Duke
(74) *Attorney, Agent, or Firm* — Sughrue Mion, PLLC

(57) ABSTRACT

The present invention relates to an enclosure which is refrigerated and kept at a predetermined set temperature ($T_e$), containing the evaporator (7) of a refrigerating unit (5). Said enclosure is characterised in that: same comprises a thermochemical system (9) the circuit of which is separate from that of the refrigerating unit and which includes a reactor (1) containing a reactive product capable of absorbing a gas, a condenser and an evaporator arranged in said enclosure (3), the reactive product and the gas being such as to be the subject, when placed in the presence of one another, of a reaction which has the effect of the gas being absorbed by the reactive product and, conversely, to be the subject of a desorption reaction of the gas absorbed by the reactive product when heat is applied thereto once the gas has been (Continued)

Figure 1:
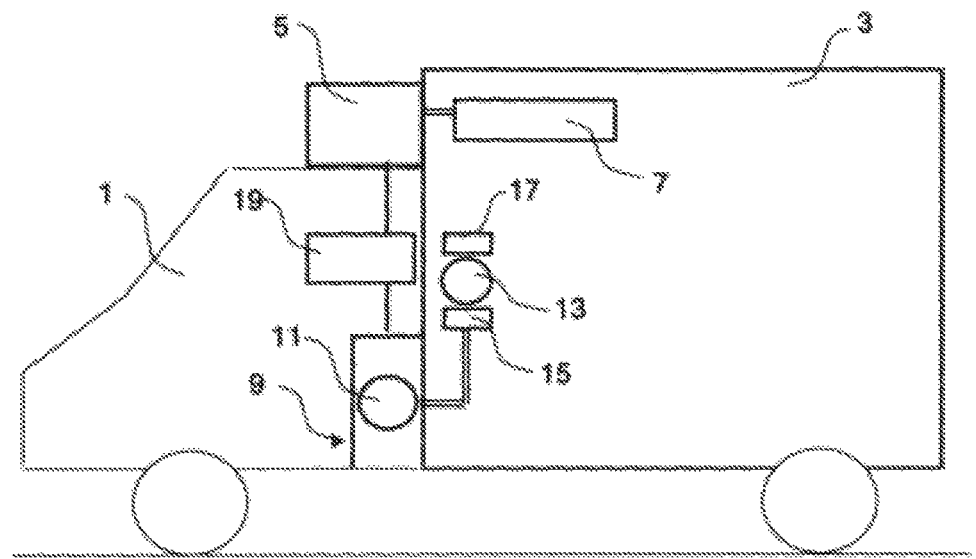

absorbed, the thermochemical system having two operating phases, namely a cold-production phase and a regeneration phase, said system comprising measurement (14) and control (19) means which only enable the thermochemical system (9) to enter the regeneration phase if the temperature of the condenser (17) thereof is below a predetermined threshold temperature ($T_s$).

8 Claims, 2 Drawing Sheets

(51) Int. Cl.
*B60H 1/32* (2006.01)
*B60P 3/20* (2006.01)
(52) U.S. Cl.
CPC ....... *F25B 17/08* (2013.01); *F25B 2700/2116* (2013.01)

ENCLOSURE REFRIGERATED BY A HYBRID COMPRESSION/ABSORPTION REFRIGERATION SYSTEM

CROSS REFERENCE TO RELATED APPLICATIONS

This application is a National Stage of International Application No. PCT/FR2013/000189 filed Jul. 16, 2013, claiming priority based on French Patent Application No. 1202024, filed Jul 17, 2012, the contents of all of which are incorporated herein by reference in their entirety.

The present invention concerns an enclosure, particularly composed of an insulated container of the type disposed on a vehicle and which is intended for transporting merchandise, said enclosure being kept cold during transport by a hybrid-type refrigeration means.

It is known that some insulated refrigerated containers are equipped with a compressor-type cooling device, called a refrigeration unit, in which the cold is produced by evaporation of a refrigerant in an evaporator disposed inside the enclosure of the container to be cooled, the gas then being compressed in the compressor in order to be condensed in a condenser disposed outside said enclosure.

Although such devices have the advantage of enabling the continuous production of cold, they nevertheless have significant disadvantages.

A first series of disadvantages is related to the fact that these devices must necessarily be permanently connected to an energy supply, specifically electric energy, required for the operation of the compressor, said supply of electric energy generally being composed of an alternator driven either by a heat engine associated with the container or by the conventional electric mains.

By their composition, such devices have the significant disadvantage of constituting a permanent source of noise and environmental pollution. The result is that such means of cold production are inoperable when the vehicle carrying the refrigerated enclosure is in an area where the operation of heat engines is prohibited, or, more simply, when for various reasons the source of energy proves to be unusable.

A second series of disadvantages of these refrigeration systems is their weight and the space they occupy, as well as their price and required maintenance.

Moreover, it is known that, especially for safety reasons, it is common on transport vehicles to use refrigeration systems that have a capacity greater than is strictly necessary so that, in the event extra energy would be necessary for certain specific and occasional reasons, the systems are capable of ensuring their operation. Now, it is obvious that this potential extra energy kept in reserve represents a significant part of the overall refrigeration investment in terms of extra equipment and maintenance costs.

Furthermore, also known, particularly by patent applications FR10.04120 and FR11.03209 in the name of the applicant, are thermochemical cold production systems which are essentially composed of two elements, namely an evaporator containing a gas and liquid phase and a reactor containing reactive salts. Such a thermochemical system operates in two distinct phases, i.e. a cold production phase and a regeneration phase.

During the cold production phase, or low pressure phase, the ammonia stored in the evaporator evaporates, which generates the desired cold production, and during an exothermic thermochemical reaction this ammonia, in gaseous phase, is attached to the reactive salts contained in the reactor.

It is understood that, in such a system, once the reserve of liquid ammonia contained in the evaporator is exhausted, the cold production phase is terminated and the system must then be reactivated during the so-called regeneration phase.

At the beginning of the regeneration phase, or high pressure phase, the reactor contains a reaction product resulting from combining the gas with the reactive salt. The regeneration operation consists of releasing this gas by heating the reaction product contained in the reactor, and, once released, this gas is condensed in a condenser. The thermochemical system is then again available for a new cold production cycle.

This type of thermochemical cold production system has the advantage of being able to generate cold nearly instantaneously by the simple release into the reactor of the gas contained in the evaporator.

Such systems are also particularly advantageous in that they enable a specific large quantity of frigories to be stored in potential form.

However, it is obvious that the major disadvantage of thermochemical cold production systems is their inability to function continuously because their cold production phase must necessarily be followed by a regeneration phase. Furthermore, because this regeneration phase takes place at high pressure and high temperature, it generates high mechanical stresses for the entire thermochemical system, which directly affects its weight and cost.

Patent application DE 10 2005 004397 describes a system for cooling and maintaining at temperature the cabin of a vehicle in which the cooling system of the engine includes a radiator from which the heat, produced during operation, is used to regenerate the cooling system of the cabin.

A purpose of the present invention is to propose an enclosure that has a cold production and maintenance system which combines the advantages of the two aforementioned cold production techniques. A purpose of the present invention is also to reduce the pressure during the regeneration phase in order to reduce the mechanical stresses to which the elements of the thermochemical system are subject. A purpose of the present invention is also to propose means making it possible to supplement compressor-type refrigeration devices in order to enable them to meet the occasional need for excess capacity without having to over-dimension them from a technical point of view.

An object of the present invention is therefore an enclosure, refrigerated and maintained at a specific desired temperature, containing the evaporator of a refrigeration unit, characterized in that:

it includes a thermochemical system, the circuit of which is independent of the circuit of the refrigeration unit and which is of the type comprising a reactor containing a reactive product capable of absorbing a gas, a condenser and an evaporator disposed in said enclosure, the reactive product and the gas being such that, when they are placed in the presence of each other, they produce a reaction resulting in the absorption of the gas by the reactive product, and, in the reverse, they are the object of a desorption reaction of the gas absorbed by the reactive product under the effect of heating applied thereto when it has absorbed the gas, the thermochemical system having two phases of operation, i.e. a cold production phase and a regeneration phase, it includes measuring and control means which only allow the thermochemical system to enter the regeneration phase on the condition that the temperature of the condenser of said system is below a specific threshold temperature.

Preferably, the refrigerated enclosure according to the invention will include control means that will block the changeover of the thermochemical system to its cold production phase as long as the operation of the refrigeration unit is not interrupted. The blocking of the thermochemical system may be obtained while keeping in operation means of heating the reactor after the regeneration phase thereof. Preferably, the heating means of the reactor will be the same as those used during the regeneration phase of the thermochemical system.

The thermochemical system used in the refrigerated enclosure according to the invention will advantageously use ammonia gas and a reactive product composed of manganese chloride. In such implementation the threshold temperature may be on the order of 5° C.

Moreover, the enclosure according to the invention may include control means capable of activating the thermochemical system when its temperature rises above a certain specific threshold.

An object of the present invention is also a method of cooling an enclosure and maintaining it at a specific desired temperature by means of a refrigeration unit and a thermochemical system, the circuits of which are independent of each other, of the type having a reactor containing a reactive product capable of absorbing a gas, a condenser and an evaporator disposed inside said enclosure, the reactive product and the gas being such that when they are placed in each other's presence a reaction is produced resulting in the absorption of the gas by the reactive product, and, in reverse, a reaction is produced of desorption of the gas absorbed by the reactive product under the effect of heat applied thereto when it has absorbed the gas, the thermochemical system having two phases of operation, i.e. a cold production phase and a regeneration phase, characterized in that entry of the thermochemical system into the regeneration phase is allowed on the condition that the temperature of the condenser of said system is below a specific threshold temperature.

According to the invention, the changeover of the thermochemical system to its cold production phase can be blocked as long as the operation of the refrigeration unit is not interrupted.

Also according to the invention, the simultaneous operation of the refrigeration unit and the thermochemical system can be controlled, particularly in order to relieve the thermochemical system of the cooling power demanded of it.

Figure 2:
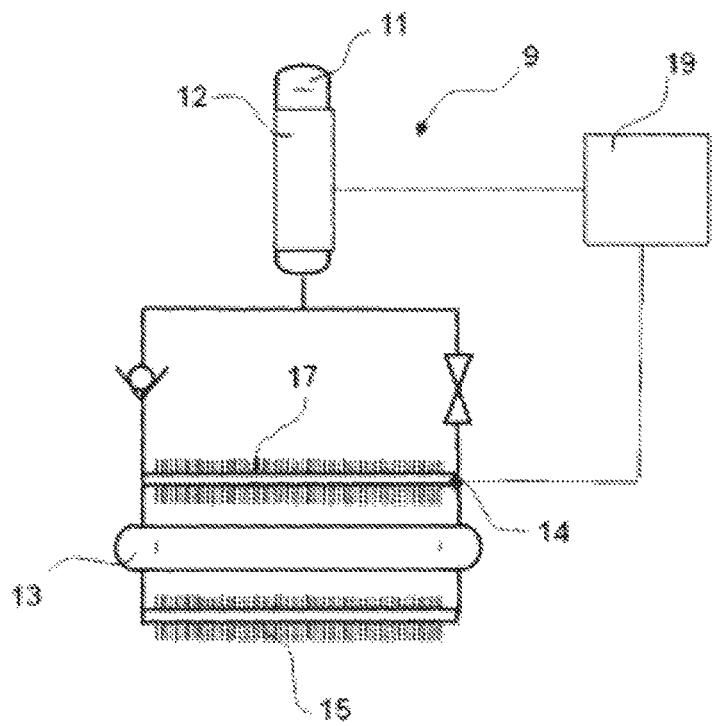
Figure 3A:
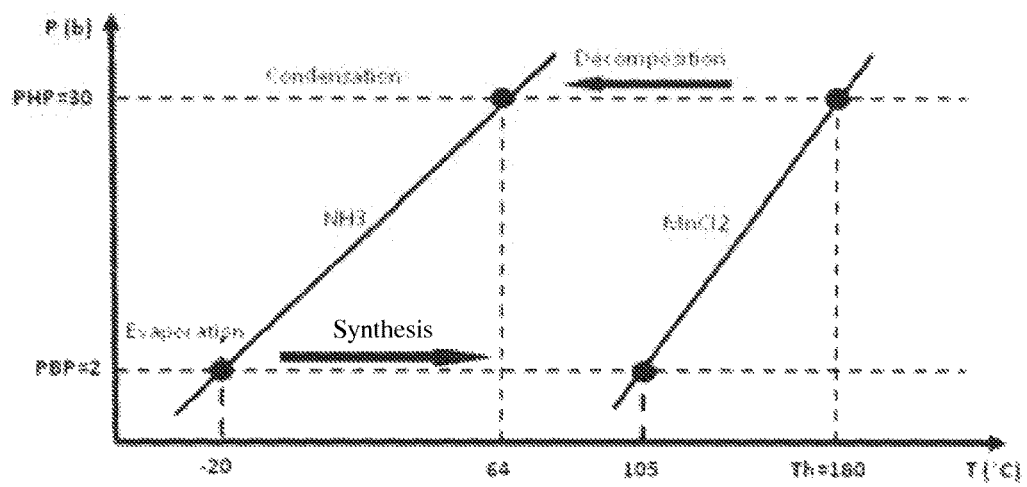
Figure 3B:
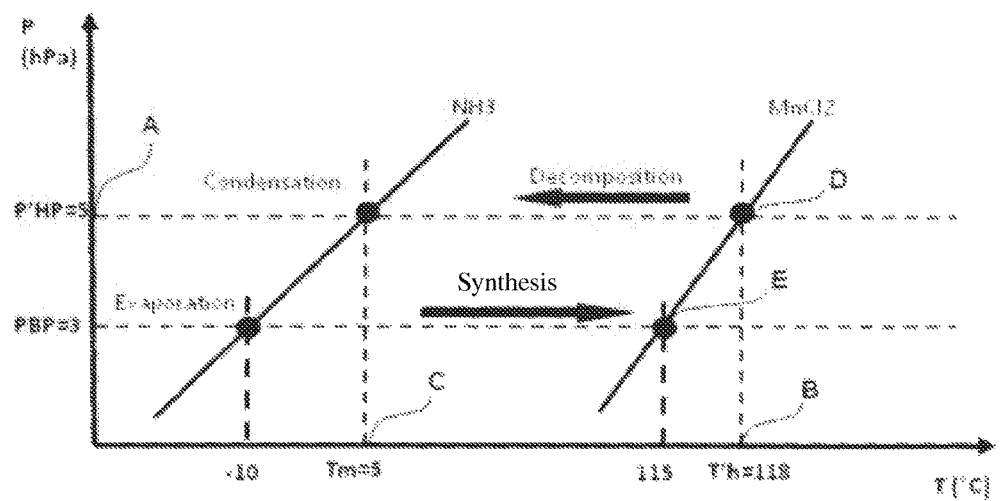

An embodiment of the present invention, provided by way of non-limiting example, is described hereinafter with reference to the appended drawings in which:

FIG. 1 is a schematic view of a vehicle equipped with a refrigeration and temperature maintenance system according to the invention, FIG. 2 is a detailed view of the thermochemical system used in the system according to the invention, FIGS. 3a and 3b are diagrams representing the operating cycle of a thermochemical system according to the prior art and the technique according to the invention, respectively.

Represented in FIG. 1 is a delivery truck 1 provided with a refrigerated insulated container 3. The truck 1 is provided with a conventional compressor-type refrigeration unit 5, the compressor and condenser of which are disposed on the roof of the vehicle and an evaporator 7 disposed inside the refrigerated container 3.

The vehicle 1 is also provided with a thermochemical system 9 which comprises, as also represented in FIG. 2, a reactor 11 disposed outside the container 3, a reservoir 13, as well as an evaporator 15 and a condenser 17 which are disposed inside said reservoir.

According to the invention, the circuits of the refrigeration unit 5 and of the thermochemical system 9 are totally independent of each other; that is, they are not linked to each other by any connection.

In a known manner, the reactor 1 contains a reactive product, for example, in this instance manganese chloride able to absorb a specific gas contained in the reservoir 13, in this instance ammonia. When the thermochemical system is started (cold production phase), i.e. the reservoir 13 is opened, the gas contained therein is evaporated in the evaporator 15 which generates the desired cold production and is combined with the reactive product of the reactor according to an exothermic thermochemical reaction. Once the gas reserve is exhausted, a change is made to the regeneration phase during which the reaction product formed in the reservoir 13 is heated, which, by reverse thermochemical reaction, releases the gas in a gaseous phase which is then condensed in the condenser 17 and is recovered in the reservoir 13. The operation cycle is then ended.

Moreover, the enclosure according to the invention includes management means 19 that are controlled specifically by means of a microcontroller, and which are capable of controlling the various steps of operation of the refrigeration unit 5 and of the thermochemical system 9.

According to the invention, at the beginning, i.e. when the container 3 is at a temperature close to the external temperature, the management means 19 activate the operation of the refrigeration unit 5 until the interior temperature of the enclosure 3 reaches the desired cooling temperature.

Next, for example during delivery operations, or for any other reason, for example in order to avoid noise or environmental pollution, the operation of the refrigeration unit 5 can be interrupted, and the management means 19 then activate the operation of the thermochemical system 9 which takes over from the refrigeration unit and ensures that the desired temperature Te of the refrigerated enclosure 3 is maintained.

The thermochemical system can also be used simultaneously with the refrigeration unit, which makes it possible either to use a compressor of lower power, and therefore much less expensive, or, for identical composition of the compressor, to have greater cooling power.

When the cold production phase, or low pressure phase, of the thermochemical system is ended, the management means 19 order, under certain conditions that will be explained hereinafter, the changeover of said system to the regeneration phase. To do this, the reactor 11 is heated, for example by means of a temperature controlled heating mantle 12.

In a particularly advantageous manner according to the invention, this regeneration phase is performed while the condenser 17 of the thermochemical system 9 is at a temperature Tc near the temperature of the refrigerated enclosure 3, i.e. at a relatively low temperature with respect to the exterior temperature, the temperature at which the regeneration is normally performed according to the prior art. Indeed, because the condenser 17 is located inside the refrigerated container, the temperature of said container—which, for example, is on the order of 5° C.—is far lower than the temperature at which condensation is normally performed.

Represented in FIGS. 3a and 3b are the respective operating cycles of two thermochemical systems of the same construction, i.e. same gas (ammonia) and the same reactive product (manganese chloride), in which the condensation during the regeneration phase is performed, according to the prior art, on the one hand at a condensation temperature near the ambient temperature, i.e. for example at a temperature that in some operating conditions can be around 64° C., and on the other hand according to the invention at a temperature close to the one existing inside the enclosure 3, i.e. 5° C.

These graphs show that the pressure existing in the thermochemical system during the regeneration phase, or high pressure phase, has a value $P_{HP}$ on the order of 30 hPa according to the prior art, while according to the invention this pressure $P'_{HP}$ is on the order of 5 hPa.

Moreover, it can be seen in these same graphs that the temperature $T_H$ to which the reactor of the thermochemical system should be exposed in order to ensure the regeneration phase existing in the thermochemical system during this high pressure phase is on the order of 180° C. according to the prior art, while this temperature $T'_H$ is on the order of 118° C. according to the invention.

The present invention therefore makes it possible to perform the regeneration phase of the thermochemical system at a temperature and pressure that are far lower than those according to the prior art. It therefore makes it possible to produce thermochemical systems with mechanical strength qualities that are less than those normally used, thus enabling the use of materials of lesser mechanical characteristics to produce these systems, which makes it possible to lower production costs of such apparatuses.

For example, in this way it becomes possible to produce reactors and/or evaporators/condensers composed particularly of synthetic materials instead of the normally used stainless steel, which is particularly heavy and costly. In addition, it allows the use of reactive salts that are less efficient than those used in the prior art.

To do this the management means 19 of the refrigeration and temperature maintenance system according to the invention are associated with means capable of measuring the temperature $T_C$ of the condenser 17 of the thermochemical system, such as a sensor 14. Thus, before changing over to the regeneration phase of the thermochemical system, the management means 19 verify that the temperature $T_C$ of the condenser 17 is below a specific threshold value $T_S$ (for example, 5° C. in the example illustrated in FIG. 3b), and if it is not, said means block the entry into the regeneration phase by blocking the activation of the heating mantle 12, which makes it possible to prevent the pressure and temperature from exceeding the values for which the mechanical strength of the elements of the thermochemical system were designed.

So, for example, if said mechanical elements are designed to withstand a pressure of 5 hPa (point A FIG. 3b) and a temperature of 118° C. (point B FIG. 3b), the management means 19 of the system according to the invention allow the regeneration phase only on the condition that the temperature of the condenser 17 is below the value $T_M$, or 5° C. in this example (point C FIG. 3b).

The system according to the invention is particularly advantageous as a supplemental means of contributing frigories. As previously mentioned, refrigeration units on board vehicles are usually oversized in refrigeration capacity so as to be able to handle occasional unexpected additional demand for cooling energy. According to the invention, the management means 19 that control the operation of the refrigeration unit 5 and the on-board thermochemical system 9 can, in a specific program, order said thermochemical system to be brought on line simultaneously with the refrigeration unit when the temperature inside the enclosure 3 rises above the specific desired value $T_e$, and order the stopping thereof when the desired temperature is again reached inside the enclosure.

Such an embodiment of the present invention is particularly advantageous in that it will makes it possible to avoid using oversized refrigeration units, which represents a gain with respect to weight and required space for these devices, resulting in a cost savings.

The present invention is also particularly advantageous in that, in one embodiment thereof, it enables the elimination of the mechanical parts forming the manual or electrical valves that order the changeover of the reactor of the thermochemical system from its position in the regeneration phase to its position in the cold production phase, and vice versa.

Thus, to prevent the thermochemical system from changing over to cold production phase, it is left in the heating position after the regeneration phase, during which the reactor 11 is heated by means of a heater band 12 to a temperature of 118° C. in this example (point B FIG. 3b), thus blocking its position of equilibrium at point D of the curve 3b.

In this way, as long as there is electric current supplying the refrigeration unit, and therefore the heating means of the thermochemical system reactor, the changeover of said thermochemical system to the cold production phase is blocked. However, as soon as the electric current is interrupted, the heating of the reactor is interrupted at the same time and the equilibrium point D is moved towards the equilibrium point E. When the latter point is reached, the thermochemical system changes over to the cold production phase.

It can therefore be understood that the present invention allows a reliable changeover from the regeneration phase to the cold production phase without the use of mechanical switching devices, the fragility and cost of which is recognized.

The invention claimed is:

1. A system comprising an insulated enclosure having a temperature, said temperature having to be maintained at a desired temperature value $T_e$, said system comprising: a refrigeration unit which comprises a refrigeration circuit and a refrigeration-unit evaporator; and a thermochemical system having a thermochemical circuit independent of said refrigeration circuit, said thermochemical system comprising a reactor containing a reactive product capable of absorbing a gas, a condenser and an evaporator disposed in said enclosure, said condenser having a condenser temperature, said reactive product and said gas being such that, when placed together, said gas and said reactive product are the object of a reaction resulting in the absorption of said gas by said reactive product, and in the reverse, said gas and said reactive product are the object of a gas desorption of said gas under the effect of heating applied to said reactive product once said reactive product has absorbed said gas wherein said refrigeration-unit evaporator is disposed inside said insulated enclosure said evaporator is disposed inside said insulated enclosure and said system comprising a temperature sensor for measuring the temperature $T_c$ of said condenser and a microcontroller associated with said temperature sensor for allowing said gas desorption only on the condition that the value of said condenser temperature is below a given condenser threshold temperature and also for blocking the changeover of said thermochemical system from said gas desorption to said gas absorption as long as the operation of said refrigeration unit is not interrupted.

2. The system according to claim 1 further comprising a heater for heating said reactor, and wherein said microcontroller is adapted to stop said heater of said reactor thereby blocking said regeneration phase of said reactor.

3. The system according to claim 2, wherein said heater is adapted to be used during said gas desorption of said thermochemical system.

4. The system according to claim 1, wherein said refrigeration unit and said thermochemical system are capable of operating simultaneously.

5. The system according to claim 1, wherein said gas is ammonia gas and said reactive product is composed of manganese chloride.

6. The system according to claim 5, wherein said condenser threshold temperature is of the order of 5° C.

7. The system according to claim 1, wherein the microcontroller is configured to activate said thermochemical system when said enclosure temperature rises above an enclosure threshold value.

8. A method of cooling an insulated enclosure and maintaining said insulated enclosure at a specific desired temperature by a refrigeration unit comprising a refrigeration-unit condenser disposed inside said insulated enclosure, and further by a thermochemical system, said thermochemical system and said refrigeration unit having a thermochemical circuit and a refrigeration circuit, respectively, said thermochemical circuit and said refrigeration circuit being independent of each other, said thermochemical system containing a gas and having a reactor containing a reactive product capable of absorbing said gas, a condenser having a condenser temperature and an evaporator, said reactive product and said gas being such that when said gas and said reactive product are placed together, a reaction is produced resulting in the absorption of said gas by said reactive product, and in reverse, a gas desorption of said gas absorbed occurs under the effect of heat applied to said reactive product once said reactive product has absorbed said gas, wherein said condenser and said evaporator of said thermochemical system is disposed inside said insulated enclosure whereas said reactor is disposed outside said insulated enclosure and wherein said temperature of said condenser is measured and said gas desorption is operated on the condition that the value of said condenser temperature is below a specific threshold temperature and wherein said changeover of said thermochemical system from said gas desorption to said gas absorption is blocked as long as said refrigeration unit is operating.

* * * * *